(12) United States Patent
Taves

(10) Patent No.: US 9,750,369 B1
(45) Date of Patent: Sep. 5, 2017

(54) COFFEE, TEA, OR BEVERAGE MAKING DEVICE AND METHOD

(71) Applicant: Joshua Tyler Taves, Denver, CO (US)

(72) Inventor: Joshua Tyler Taves, Denver, CO (US)

(73) Assignee: Joshua Taves, Denver, CO (US)

(*) Notice: Subject to any disclaimer, the term of this patent is extended or adjusted under 35 U.S.C. 154(b) by 16 days.

(21) Appl. No.: 14/809,215

(22) Filed: Jul. 25, 2015

Related U.S. Application Data

(60) Provisional application No. 62/031,867, filed on Aug. 1, 2014.

(51) Int. Cl.
| | | |
|---|---|---|
| *A47J 31/44* | (2006.01) | |
| *A23L 2/70* | (2006.01) | |
| *A23F 3/18* | (2006.01) | |
| *A23F 5/26* | (2006.01) | |

(52) U.S. Cl.
CPC ............. *A47J 31/4407* (2013.01); *A23F 3/18* (2013.01); *A23F 5/26* (2013.01); *A23L 2/70* (2013.01); *A23V 2002/00* (2013.01)

(58) Field of Classification Search
CPC  A47J 31/4407; A23F 3/18; A23F 5/26; A23L 2/70
See application file for complete search history.

(56) References Cited

U.S. PATENT DOCUMENTS

| | | | | | |
|---|---|---|---|---|---|
| 1,462,322 | A | * | 7/1923 | Casoletti | A47J 31/16 219/507 |
| 1,468,411 | A | * | 9/1923 | Ong | A47J 31/06 210/464 |
| 2,047,164 | A | * | 7/1936 | Coleman | A47J 31/50 222/131 |
| 2,346,924 | A | * | 4/1944 | Lehmann | A47J 31/043 215/316 |
| 2,645,178 | A | * | 7/1953 | Brainard | B41C 1/08 101/31 |
| 3,333,528 | A | * | 8/1967 | Bender | A47J 31/106 137/590 |
| 3,739,932 | A | * | 6/1973 | Westover | A47J 45/10 16/435 |
| 3,927,608 | A | * | 12/1975 | Doyel | A47J 31/20 99/287 |
| 4,694,737 | A | * | 9/1987 | Wittlinger | A47J 31/446 210/499 |
| D471,767 | S | * | 3/2003 | Ucar Cortes | D7/598 |
| 6,732,635 | B2 | * | 5/2004 | Jensen | A47J 31/14 210/469 |
| 6,797,304 | B2 | * | 9/2004 | McGonagle | A47J 31/20 426/431 |
| 6,805,040 | B1 | * | 10/2004 | Chang | A47J 31/02 99/285 |
| D640,084 | S | * | 6/2011 | Sheppard | D7/316 |

(Continued)

*Primary Examiner* — Anthony Weier

(57) ABSTRACT

One embodiment of a device used for Coffee Cupping in which coffee grounds, tea or other sediment to be extracted are mixed with a liquid in a vessel with a narrow section 24 between an upper chamber 20 and a lower chamber 26. After the sediment has settled in the lower chamber, a stopper 28 (attached to a rod 30, and a handle 32) is inserted into the narrow section 24 thereby sealing off the lower chamber 26 and allowing the now sediment-free liquid in the upper chamber 20 to be poured out using the pouring spout 22, into another vessel for tasting. Alternative embodiments are described and shown.

10 Claims, 6 Drawing Sheets

(56) References Cited

U.S. PATENT DOCUMENTS

| | | | | |
|---|---|---|---|---|
| D690,549 S | * | 10/2013 | Porraro | D7/300 |
| 2006/0021524 A1 | * | 2/2006 | Liu | A47J 31/20 |
| | | | | 100/116 |
| 2011/0056385 A1 | * | 3/2011 | McLean | A47J 31/20 |
| | | | | 99/297 |
| 2014/0072684 A1 | * | 3/2014 | Madden | A47J 31/005 |
| | | | | 426/431 |
| 2014/0356501 A1 | * | 12/2014 | Juris | A23F 3/18 |
| | | | | 426/433 |

* cited by examiner

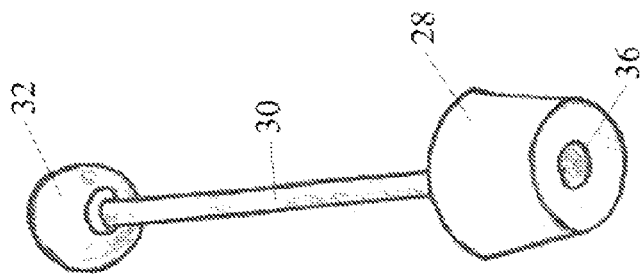
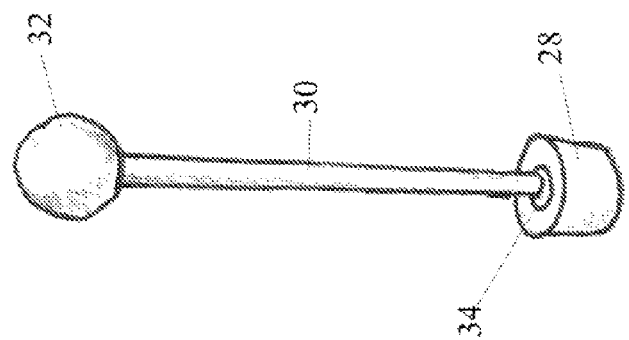
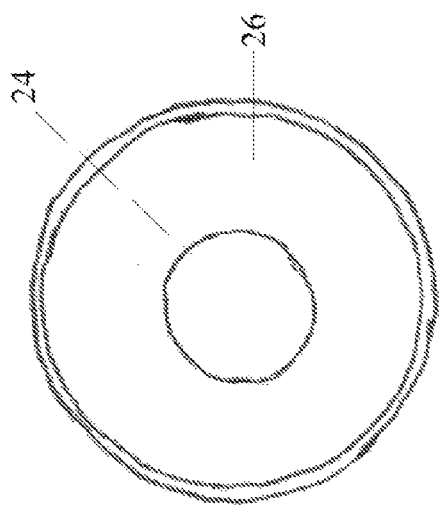
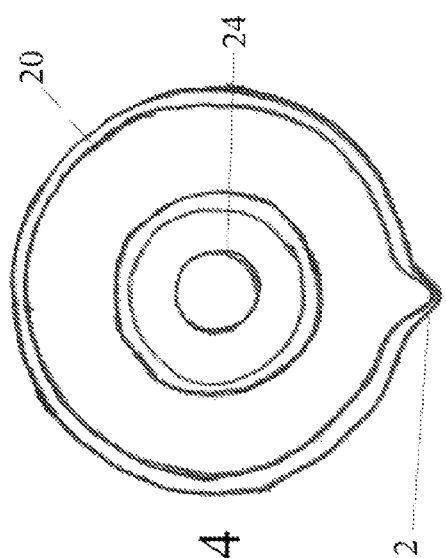
FIGURE 6
FIGURE 5
FIGURE 3
FIGURE 4

COFFEE, TEA, OR BEVERAGE MAKING DEVICE AND METHOD

CROSS REFERENCE TO RELATED APPLICATIONS

This application claims the benefit of PPA Ser. No. 62/031,867 filed Aug. 1, 2014 by the present inventor, which is incorporated by reference.

BACKGROUND—PRIOR ART

The following is a tabulation of some prior art that presently appears relevant:

U.S. Patents

| Pat. No. | Kind Code | Issue Date | Patentee |
| --- | --- | --- | --- |
| D325112 | S | Apr. 7, 1992 | Thompson |
| D685608 | S1 | Jul. 9, 2013 | Bangert |
| D369518 | S | May 7, 1996 | Wilson |
| 6,797,304 | B2 | Sep. 28, 2004 | McGonagle |
| D557978 | S1 | Dec. 25, 2007 | Bodium |

NON PATENT LITERATURE DOCUMENTS

SCAA Standards Committee. "Cupping Standards." *Specialty Coffee Association of America*. Jun. 20, 2012. Web. Accessed Jun. 16, 2015.

BACKGROUND

Coffee is one of the most highly traded commodities in the world. All around the world millions of pounds of coffee are roasted, ground, brewed, and consumed each and every day. There are vast intricacies that exist in the traditions and opinions involved in how to brew the perfect cup and what the best coffee should or shouldn't taste like. From the "Pour-Over" coffee of Japan, to the Espresso of Italy, and the Cezve of Turkey, there are innumerable ways to make the "perfect" cup of coffee based on the traditions of the place. One common practice that unites the coffee industry professionals around the world, is that of Cupping. Cupping is the practice of tasting several coffees side by side, in a neutral and consistent manner, for the sake of evaluating the quality of the given coffees.

The history of Coffee Cupping is unclear, but it is known that in the past century, its popularity as a daily quality control practice has spread from large corporations evaluating hundreds of coffees a day, to small, artisan coffee roasters meticulously tasting their select offerings. Today, the most commonly accepted Cupping practices have been laid out by the Specialty Coffee Association of America, a recognized worldwide leader in coffee quality standards (hereafter referred to as "SCAA"). They sanction in their "Cupping Practices" publication (above mentioned) that the recipe for Cupping should consist of 8.25 grams of ground coffee, with 5.07 fluid ounces of 198-202 degree Fahrenheit water. The vessel to be used should be made of glass or ceramic, and hold between 7 and 9 fluid ozs. The process then goes that the water is to be poured over the coffee grounds and allowed to brew undisturbed for 3:30-4 minutes. During this time, the coffee grounds rise to the top of the vessel and are floating in a "crust" on top of the water. After 3:30-4 minutes elapse, the evaluators performing the Cupping, or "Cuppers," stir the layer of coffee grounds floating on the top of the liquid to release aromas trapped there. At this point, the coffee grounds are fully saturated and no longer buoyant, causing them to sink to the bottom of the vessel. Any remaining particles floating on top (foam, coffee "skin" or parchment, or various other materials) are scraped off using 2 spoons, while the coffee grounds rest on the bottom of the vessel. At the point when the Cuppers are ready to evaluate the coffee for taste, a spoon is then used (according to the SCAA, a Cupping Spoon must be made of non-reactive metal, and hold between 0.135 and 0.169 fl oz of coffee) to remove a small amount of coffee from the top of the vessel, being careful not to disturb or resuspend the coffee grounds on the bottom of the vessel in any way. The coffee is then slurped loudly from the spoon for the purpose of aerating the sample across the Cuppers' palate. I have often found this practice to be foreign and difficult to master for first time or inexperienced Cuppers. The Cuppers evaluate the sample, take notes, and then rinse their spoons in a communally shared water container, and proceed to repeat the tasting and spooning procedure in the next sample containing vessel. Each evaluator will spoon and drink from the same sample vessel, and rinse their spoon in the same rinse cup as the rest of the Cuppers present. Often 10 or more Cuppers will share the same set of samples and rinse cups without regard to sanitation or germ sharing. Also, an appropriate Cupping vessel containing 5.07 fl ozs of coffee sample will contain about 3.5 fl ozs of usable coffee sample due to the fact that when the sample gets too low in the vessel, the bed of coffee grounds at the bottom becomes more easily disturbed, causing the last 1.5 fl ozs (approximate) of sample to be unusable. I have found that 3.5 fl ozs is frequently an insufficient amount for large groups of Cuppers (5 or more) to fully experience and taste the coffee sample.

In the past the technology used in Cupping has had very little specificity. No patents have yet been found that relate to devices or apparatuses intended for use in Coffee Cupping. The majority of Coffee Cuppers do not use a specific type of spoon, but instead use common soup spoons. In the past, approximately 8 oz glass or ceramic bowls were commonly used in the specified size for Cupping (more commonly referred to as Ramekins and similar in design to the patent published by Thompson). However, these were not designed specifically for Cupping. Currently, it has been ascertained that it is more common to use a standard 8 oz water or "Gibraltar" style glass as seen in Wilson's patent, although these also were not designed specifically for Cupping, but rather as a drinking glass. Bangert has published a patent for a vessel that allows for more aromatics to be captured in procedures such as Cupping (although not specified), however, it does not provide for a more sanitary environment in which to partake in the Cupping process. Bangert's vessel also utilizes the traditional method of not disturbing the vessel once the grounds have fully settled resulting in the continuation of difficult tasting practices. On past occasions, certain coffee professionals have used French Press style coffee brewers as seen in Grant's patent to emulate the Cupping process with little success. I have found that using a French Press for Cupping usually requires a secondary filtration method or modified practice due to the fact that the filter used in a French Press is porous and allows fine sediment to pass through while pouring the brewed coffee out. Also, I have found that said filter causes agitation of the coffee grounds when inserted thereby creating an extraction that differs from the Cupping process. McGonagle's device comes close to achieving Cupping-like extraction from coffee brewing, but I find that it fails in that it still incorporates a large metal filter that agitates the coffee grounds and liquid when pressed resulting in an alteration of flavor that is not common to the Coffee Cupping process. Also, the use of a lid in McGonagle's device incorporates a component not typically used in Coffee Cupping.

SUMMARY

In keeping with one embodiment, a device, open on one end with a pouring spout, and enclosed on the opposing end, in which exists a narrow space creating an hourglass shape and allowing for the insertion of a stopper, attached to a rod, to isolate one chamber from the other, thereby isolating sunken sediment from the majority of a liquid.

Advantages

Advantages of one or more aspects are as follows: to undergo the Coffee Cupping process in a manner that is more sanitary than in previous methods, to allow the possibility for larger volumes of coffee or other such beverages to be brewed using the Coffee Cupping or similar process, to provide for the ability to pour the brewed coffee or other such liquid out of the vessel while leaving behind the sediment coffee grounds, to allow each participant in a Coffee Cupping the ability to taste a brew identical to others in a personalized vessel rather than a communal one, and to increase the ease and efficiency of the Cupping process by removing uncommon tasting practices and objects (i.e. slurping and spoons). The benefits and advantages of one or more aspects will become apparent upon an examination of the following description and drawings.

DRAWINGS

FIG. 3 shows the bottom view of FIG. 1.

FIG. 4 shows the top view of FIG. 1.

FIG. 5 shows the perspective view of the sealing device which includes a handle knob at the top of a shaft, with the other end of the shaft connected to a stopper device in one embodiment.

FIG. 6 shows the bottom-up perspective view of FIG. 5.

Figure 2:
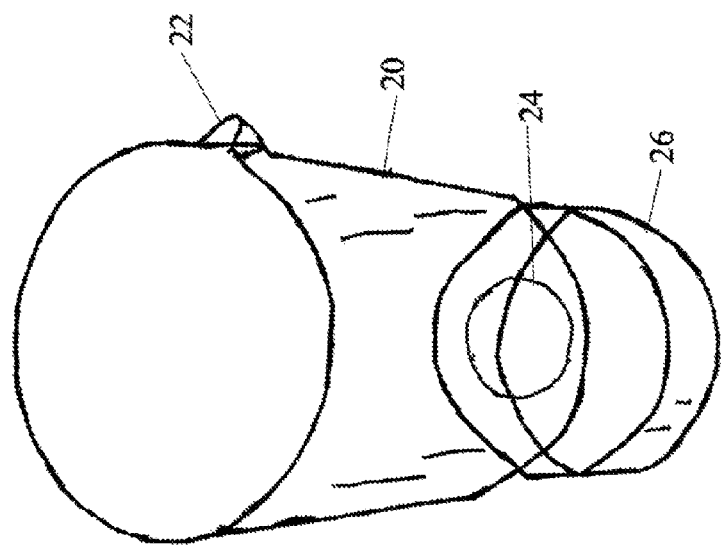
FIG. 2 shows a perspective view of FIG. 1.
Figure 1:
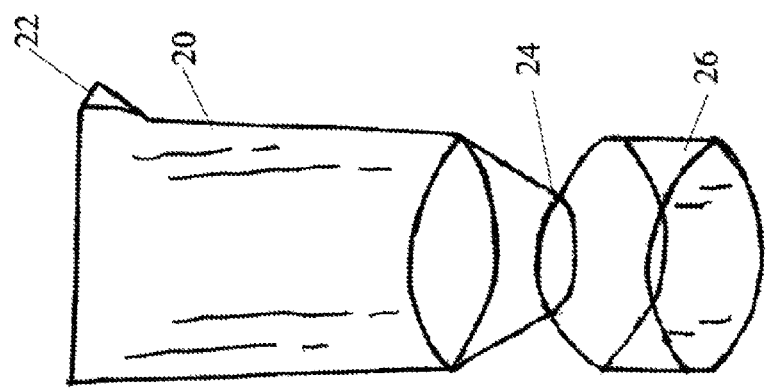
FIG. 1 shows a profile view of the cylindrical brewing vessel which includes a pouring spout attached to the opening in the top, a closed bottom, and a narrow section near the bottom in which can be inserted a device to seal off the portion below in one embodiment.

DRAWINGS—REFERENCE NUMERALS 20 upper portion of the brewing vessel
22 pouring spout
24 narrow section
26 lower portion of the brewing vessel
28 stopper
30 shaft
32 sealing device handle
34 flange
36 bolt
38 vessel handle
40 vessel gripping sleeve

DETAILED DESCRIPTION

FIGS. 1-7—First Embodiment

Figure 7:
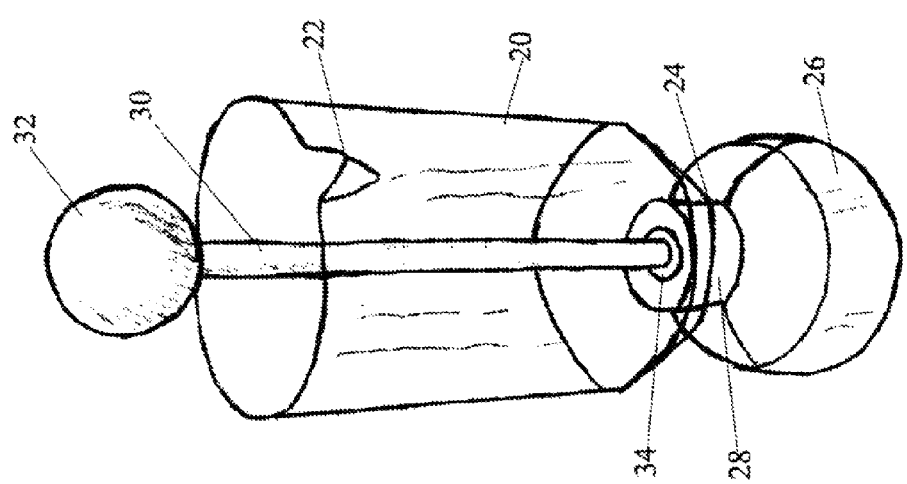
FIG. 7 shows a perspective view of FIG. 1 with the sealing device inserted.

One embodiment of the device is illustrated in FIG. 7. The vessel in FIGS. 1, 2, 3, 4, and 7 contains a main or upper portion or chamber 20 which slopes into a narrow section 24 that leads to the lower or bottom portion or chamber 26. The slope of the upper portion 20 leading down to the narrow section 24 is steep so as to allow falling particles to easily pass into the lower portion 26. The slope of the lower portion 26 sloping away from the narrow section 24 is gradual to maximize the volume of the lower chamber 26 while still allowing for the coffee grounds to be effectively poured out for cleaning after brewing. The upper portion 20 is also attached to a pouring spout 22 to easily remove the liquid. The entire vessel displayed in FIG. 1 can be constructed of various materials displaying heat resistant, non-porous and non-leaching or flavor imparting properties such as, but not limited to, glass, ceramic, metal, and certain types of plastics.

Also in FIGS. 5, 6, and 7 is the sealing device. The sealing device is comprised of the stopper 28 which can be made of any heat resistant and waterproof material that will not leach or impart flavor and is pliable so as to fully plug the narrow section. In the best impression of the inventor, a rubber, nylon, or plastic material should be used for their supple attributes. In one embodiment, the stopper 28 is attached to the shaft 30 by a bolt 36, which is threaded into the end of the shaft 30, and presses the stopper up against a flange or washer 34, thereby securing it to the shaft 30. At the opposite end of the shaft 30 to the stopper 28 is a handle or knob 32 with which to grip and use the sealing device. The handle 32 may be made out of any material which it is easy to grip, but preferably would be made out of plastic, wood, rubber, or glass.

Figure 9:
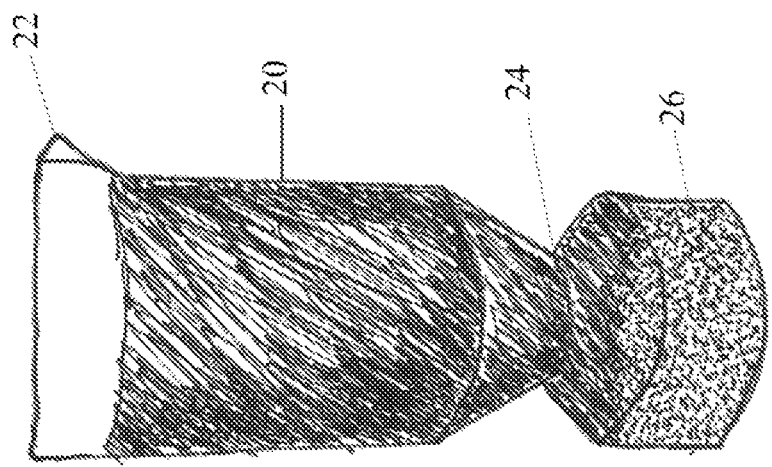
FIG. 9 shows FIG. 1 in usage with coffee grounds at the bottom of the vessel after sinking.
Figure 8:
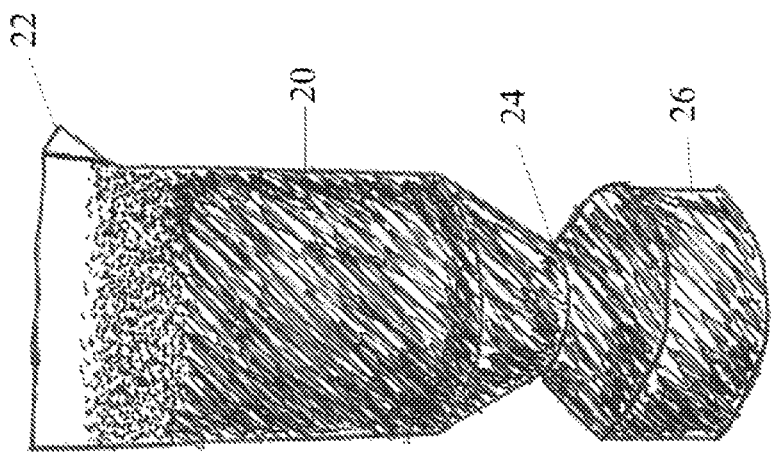
FIG. 8 shows FIG. 1 in usage with coffee grounds floating at the top of the vessel.
Figure 10:
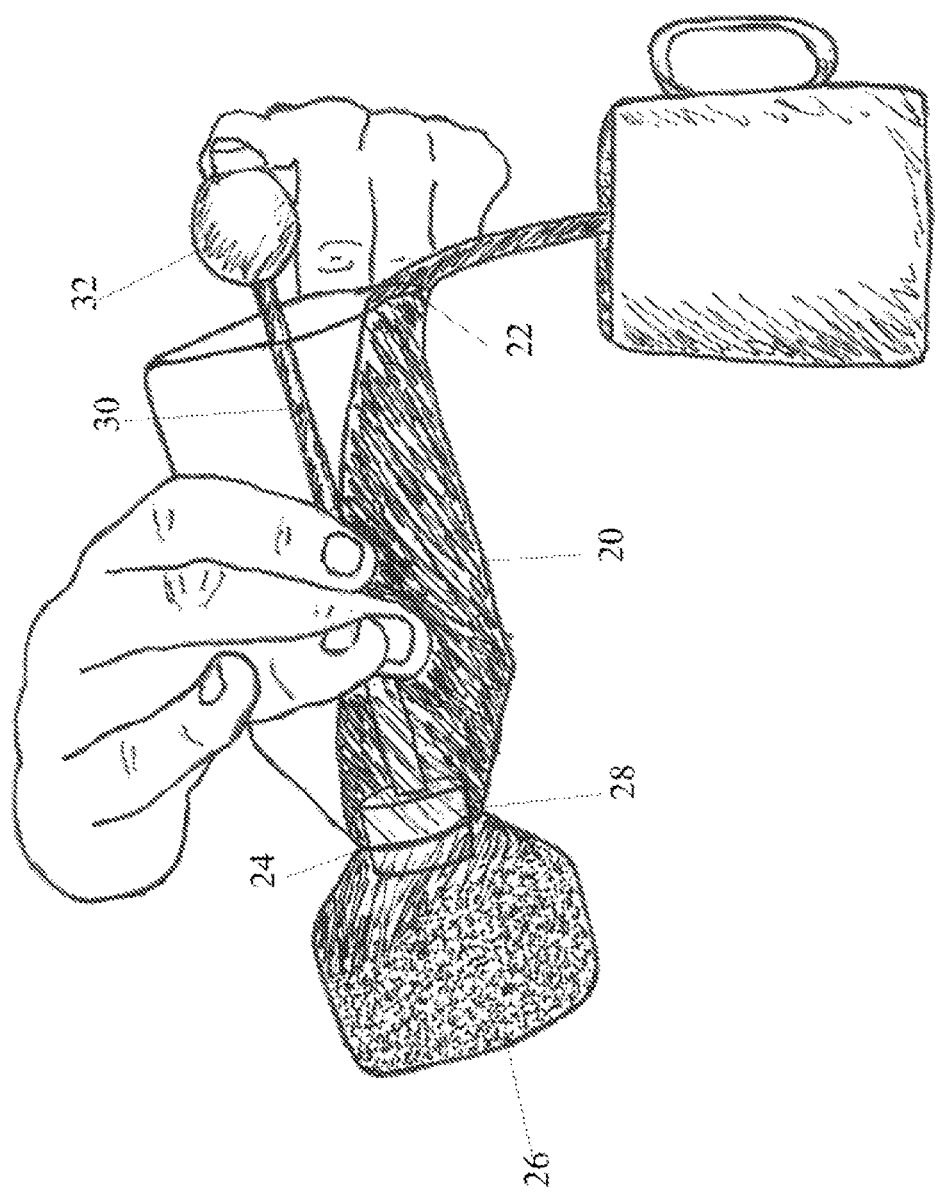
FIG. 10 shows FIG. 9, with sealing device (FIG. 5) inserted, and the liquid being poured out of the vessel.

FIGS. 8-10—Operation of First Embodiment

The process of using the Coffee, Tea, or Beverage Making Device is similar to the specified protocol for Coffee Cupping explained in the "Background" section above. Ground coffee is first poured into the vessel (FIG. 1) and falls to the lower portion 26 of the brewing vessel. Then, hot water is poured on top of the coffee, filling the brewing vessel including all of the lower chamber 26 and the majority of the upper chamber 20. At this point the grounds pass upward through the narrow section 24 and float from the lower portion 26 into the upper portion 20, resulting in a floating "crust" of coffee grounds at the top of the upper portion 20 as displayed in FIG. 8. After allowing a segment of time for the coffee to brew, the coffee grounds floating on the surface of the liquid are stirred in a process known as "Breaking the Crust." At this point the coffee grounds are fully saturated with water and no longer able to float. Then, time is allotted for the coffee grounds to sink downward through the narrow section 24 to rest on the bottom of the vessel in the lower chamber 26 as shown in FIG. 9. Any remaining bubbles or floating particles (minimal amounts) are removed from the top by skimming with a spoon by the Cupping participants while the coffee grounds are sinking and settling. At this time the sealing device (FIG. 5) is grasped by the handle 32 and the stopper 28 is inserted into the narrow section 24 thereby effectively sealing off the lower chamber 26 from the upper portion 20. Now the liquid in the upper portion 20 is free of coffee grounds, an improvement which was not allowed by previously used vessels in the Cupping process. FIG. 10 shows the user holding the stopper 28 in place by applying pressure to the handle 32 with one hand, grasping the brewing device with the other, and pouring out the liquid in the upper portion 20 using the pour spout 22. Previous methods for Coffee Cupping did not allow for the liquid to be poured into a separate drinking vessel, thereby making the tasting of the liquid difficult to those not properly indoctrinated to the practice. Also, the volume of liquid the Coffee, Tea, or Beverage Making Device is capable of producing in one embodiment is significantly larger than previously used Cupping vessels, which allows for more tasting to be conducted from a single brew. The pouring of the brewed coffee liquid out of the vessel improves sanitation above previous methodology in that it makes allowance for Coffee Cupping participants to drink from their personal vessel rather than sharing a communal vessel.

Figure 12:
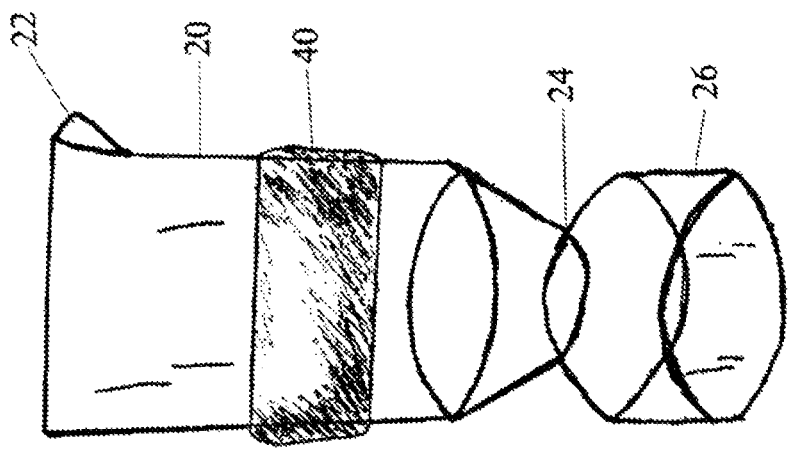
FIG. 12 shows an alternative embodiment of FIG. 1, wherein a gripping device or sleeve is surrounding the vessel.
Figure 11:
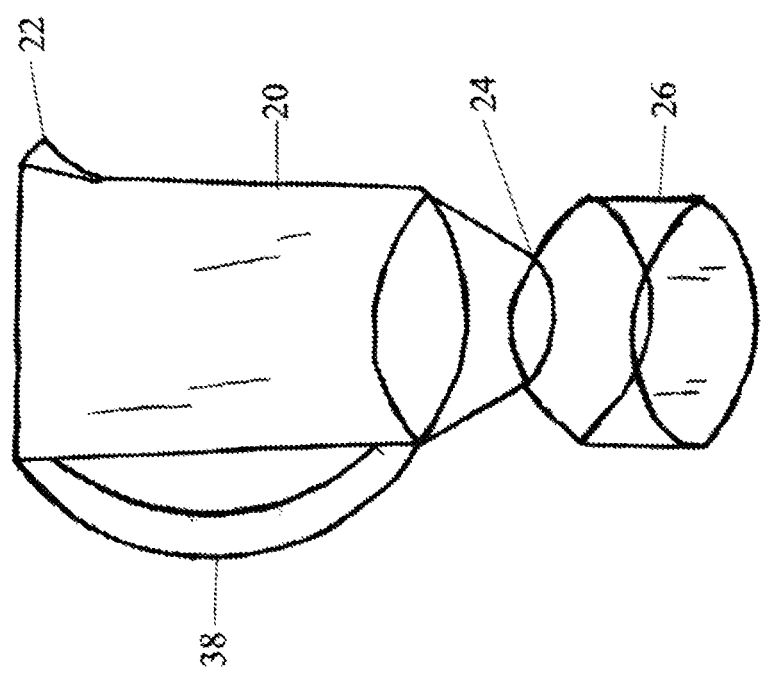
FIG. 11 shows an alternative embodiment of FIG. 1, wherein a handle is attached to the vessel.

FIGS. 11 and 12—Alternative Embodiments

In the best impression of the inventor, the greatest allowance for variance in alternative embodiments is in the ways and means of gripping the vessel while pouring out the brewed coffee liquid. FIG. 11 shows the device with an attached handle 38 for said purpose. FIG. 12 shows the device with a sleeve-like attachment 40 for said purpose.

CONCLUSION, RAMIFICATIONS, AND SCOPE

Therefore, the reader can see that at least one embodiment greatly helps to improve the Coffee Cupping process by allowing larger volumes of coffee to be brewed than previously provided for and for said liquid coffee to be poured out of the vessel. Furthermore, the device has additional advantages and ramifications in that:

it allows for multiple tasters to taste the same coffee, brewed in the same vessel, in the Coffee Cupping process, in individual, sanitary cups.
  it allows the user to effectively brew a larger volume of Cupping process coffee than previously allowed by commonly used Cupping vessels;
  it allows the user to brew a cup of coffee without the use of a disposable filter;
  it allows for the removal of tasting processes that are alien to most first time users (i.e. tasting coffee from a spoon);
  it allows the user to pour out the liquid they have brewed in the Coffee Cupping process without disrupting or removing the coffee grounds.

The above description includes many specificities, however, these should not be seen as limitations put on the scope. Instead, the above specifications should be viewed as merely a possible embodiment. For example, other variations are possible including the addition of a handle or gripping surface for the main vessel in order to improve usability during pouring. Various shapes, dimensions, volumes, and materials can be used in the construction of the main vessel as well. The pouring spout can be made longer, in different shapes, or eliminated in some possible embodiments. The sealing device could be varied in the manner the stopper is attached to the rod. Also, the shape, dimensions, or materials used in the productions of the sealing device, rod, handle, and stopper and the assembly thereof can be varied. A lid could also be added to the device in some embodiments.

As such, the scope should be determined by the appended claims and their legal equivalents and not by the embodiments illustrated above.

I claim:
1. An article for infusing coffee, tea, and other such beverages comprising:
  a. a vertically standing cylindrical vessel having an opening at its upper end and being enclosed at its lower end for the holding of a mixture of solid particles and liquid
  b. said vessel having an hourglass-shaped narrowing section thereby forming an upper portion and a lower portion of said vessel
  c. a stopper of predetermined size appropriate to fit into said hourglass-shaped narrowing section of said vessel
  d. an elongated member of predetermined size for use in transmission of said stopper into said hourglass-shaped narrowing section
  e. allowability for addition of said solid particles of said mixture and then said liquid of said mixture to the vessel wherein said liquid fills all of said lower portion of said vessel and the majority of said ripper portion of said vessel
  f. means for attachment of said stopper to said elongated member at lower end of said elongated member so as to transmit said stopper into said hourglass-shaped narrowing section
  whereby said article allows particles from said mixture to sink to the lower section of said vessel wherein same may be effectively separated from the liquid from said mixture in the upper section of said vessel upon transmission of stopper into said hourglass-shaped narrowing section thereby allowing said liquid to be poured out of said opening with an absence of said sunken particles wherein when pouring out said liquid, said stopper is held in place by applying pressure to said upper end of the elongated member and by grasping the device simultaneously.

2. The article for infusing coffee, tea, and other such beverages of claim 1 wherein said upper end of said vessel has an upper rim further comprising a pouring spout.

3. The article for infusing coffee, tea, and other such beverages of claim 1 wherein said elongated member has an upper end, said upper end including a gripping device attached to same for use in transmission of said stopper into said hourglass-shaped narrowing section.

4. The article for infusing coffee, tea, and other such beverages of claim 1 wherein said stopper is supple.

5. The article for infusing coffee, tea, and other such beverages of claim 1 wherein said stopper is non-permeable to liquid.

6. The article for infusing coffee, tea, and other such beverages of claim 1 wherein said hourglass-shaped narrowing section narrows from said upper portion at a predetermined slope to facilitate ease in allowing particles to sink.

7. The article for infusing coffee, tea, and other such beverages of claim 1 wherein said hourglass-shaped narrowing section widens into said lower portion at a predetermined slope to allow adequate volume in said lower portion.

8. The article for infusing coffee, tea, and other such beverages of claim 1 further including a gripping device attached to said vessel.

9. A method for infusing coffee, tea, and other such beverages comprising:

a. providing a vertically standing cylindrical vessel having an opening at its upper end and being enclosed at its lower end for the holding of a mixture of solid particles and liquid
b. providing said vessel having an hourglass-shaped narrowing section thereby forming an upper portion and a lower portion of said vessel
c. providing a stopper of predetermined size appropriate to fit into said hourglass-shaped narrowing section of said vessel, said stopper being non-permeable to liquid
d. providing an elongated member of predetermined size for use in transmission of said stopper into said hourglass-shaped narrowing section
e. providing means for attachment of said stopper to said elongated member at lower end of said elongated member so as to transmit said stopper into said hourglass-shaped narrowing section
f. providing the addition of said solid particles of said mixture and then said liquid of said mixture to the vessel wherein said liquid fills all of said lower portion of said vessel and the majority of said upper portion of said vessel
g. inserting of said stopper into said hourglass-shaped narrowing section by means of said elongated member for the purpose of separating said upper portion from said lower portion of said vessel
whereby said article allows particles from said mixture to sink to the lower section of said vessel wherein same may be effectively separated from the liquid from said mixture in the upper section of said vessel upon transmission of stopper into said hourglass-shaped narrowing section thereby allowing said liquid to be poured out of said opening with an absence of said sunken particles wherein when pouring out said liquid, said stopper is held in place by applying pressure to said upper end of the elongated member and by grasping the device simultaneously.

10. The method for infusing coffee, tea and other such beverages of claim 9 further including pouring of liquid from said upper portion.

\* \* \* \* \*